Sept. 27, 1927.  G. STINSON  1,643,910
BABY CARRIAGE GEAR
Filed April 8, 1925
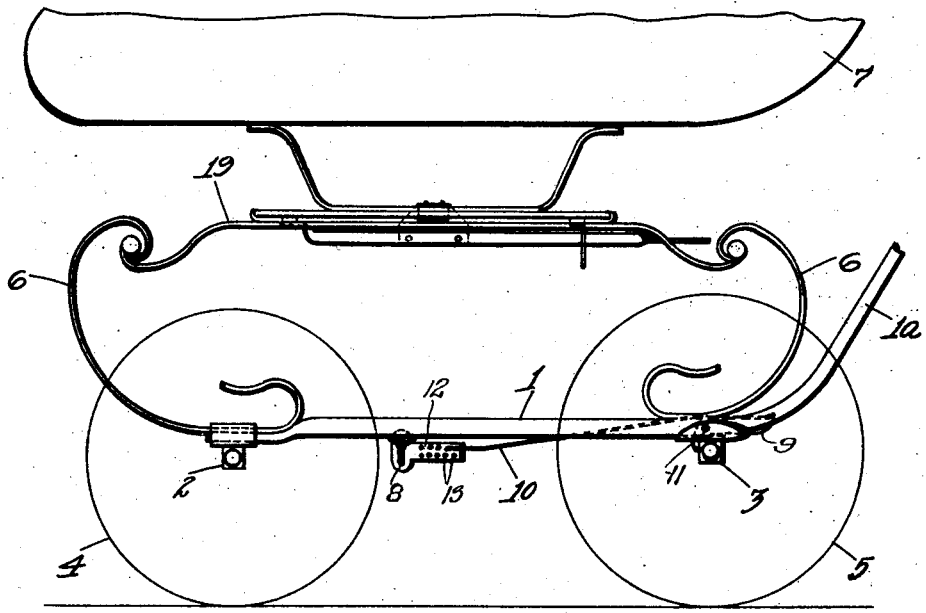
Fig. 1.
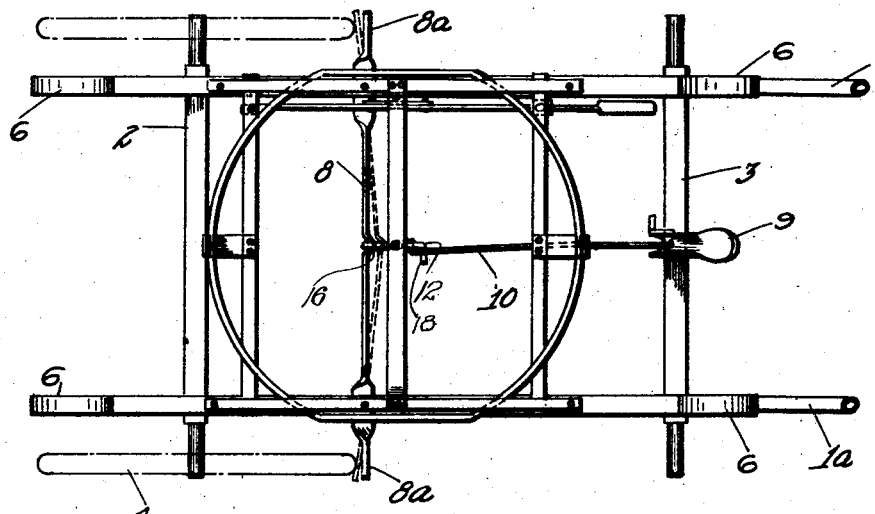
Fig. 3.  Fig. 2.
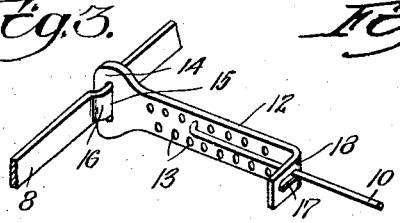
Inventor:
George Stinson
by Attorney
Owen W. Kennedy Patented Sept. 27, 1927.

1,643,910

UNITED STATES PATENT OFFICE.

GEORGE STINSON, OF GARDNER, MASSACHUSETTS, ASSIGNOR TO HEYWOOD-WAKEFIELD COMPANY, OF BOSTON, MASSACHUSETTS, A CORPORATION OF MASSACHUSETTS.

BABY-CARRIAGE GEAR.

Application filed April 8, 1925. Serial No. 21,584.

The present invention relates to baby carriages and has particular reference to the brake mechanism for the running gear.

My invention contemplates an improved brake mechanism comprising a set of parts so constructed as to be applicable to baby carriages of several types, due to the fact that the mechanism can be readily adjusted for variations in the distance between the axles and brake bars on carriages of different proportions.

The above and other advantageous features of my invention will hereinafter more fully appear, reference being had to the accompanying drawings, in which—

Fig. 1 is a view in side elevation of a baby carriage embodying my invention, a portion of the body or basket being broken away.

Fig. 2 is a plan view of the parts shown in Fig. 1, with the body removed from its bolsters.

Fig. 3 is a fragmentary perspective view showing portions of the brake mechanism on an enlarged scale.

Like reference characters refer to like parts in the different figures.

Referring first to Figs. 1 and 2, the running gear of the carriage generally comprises spaced longitudinal frame members 1, connected by a front axle 2 and a rear axle 3, upon which are mounted pairs of wheels 4 and 5, respectively. As best shown in Fig. 1, the members 1 extend upwardly and rearwardly to provide handle portions 1ª for the carriage, and the members 1 also serve to support a set of springs 6, upon which is built the reversing gear for the body 7 of the carriage.

As best shown in Fig. 2, a brake bar 8 is secured near its ends to the frame members 1, 1, the brake bar 8 being preferably of flat metal, so that its end portions 8ª may be flexed into engagement with the treads of the wheels 4 when the middle portion of the bar 8 is flexed, as indicated in dotted lines. For the purpose of flexing the bar 8, a foot pedal 9 is pivotally mounted on the rear axle 3, and a link or wire 10 extends therefrom to the brake bar 8. When the brake bar 8 is not applied to the wheels 4, the link 10 is disposed above the pivot 11 of the pedal 9, but when the pedal 9 is depressed, the link 10 is thrown below the pivot 11, thereby locking the brake bar in its flexed condition, with the portions 8ª applied to the treads of the wheels 4.

It is evident from an inspection of Figs. 1 and 2 that the distance between the brake bar 8 and the rear axle 3 will vary for carriages of different proportions, and as previously pointed out, it is one of the objects of the present invention to provide an improved brake mechanism comprising a set of parts so constructed as to be applicable to baby carriages of different types. To this end, there is provided a connector 12 between the brake bar 8 and the foot pedal 9, the connector 12 being provided with a number of holes 13 for receiving the end of the link 10 extending from the foot pedal 9, at different distances from the brake bar 8.

As best shown in Fig. 3, the connector 12 is provided with a head 14 having a slot 15 therein for receiving the brake bar 8, and the brake bar 8 is provided with an offset portion 16 which serves to position the connector 12 substantially midway between the points of attachment of the brake bar 8 to the frame members 1. The connector 12 is preferably received on the brake bar 8 before the latter is permanently attached to the frame members 1, so that when the running gear has been completely assembled with the wheels, it is a comparatively simple matter to attach the link 10 to the connector 12 to secure the proper adjustment of the brake member 8 with respect to the wheels 4.

As previously pointed out, the connector 12 is provided with holes 13 which are preferably arranged in staggered relation in two or more rows, so that the end of the link 10 may be received in the connector 12 at a relatively large number of points at different distances from the brake member 8. In finally adjusting the brake for a carriage of a given type, the bent over end of the link 10 is inserted in that particular hole of the connector 12 in which the pedal 9 will be maintained in a substantially horizontal position, as shown in full lines in Fig. 3, without placing the brake 8 under any appreciable tension, such as would cause its end portions 8ª to engage the treads of the wheels 4. In other words, the adjustment of the brake for any given carriage is such that normally the parts are more or less free, but as soon as the pedal 9 is depressed to throw the attached end of the link 10 to the right and below the pivot 11, the brake bar 8 will be flexed at its middle, as shown, and will be locked in this flexed position with its end portions 8ª firmly in engagement with the treads of the wheels 4.

It is obvious that the wide range of adjustment afforded by the connector 12 permits the application of the parts of my improved brake mechanism to many different types of carriages, in which the distances between the rear axles and the brake bars may vary through a range of two or three inches. In manufacturing such a line of carriages, the brake bars are all made the same, and prior to the attachment of each brake bar to its carriage, a connector 12 is placed on the bar, which connector is adapted to be automatically centered on the bar by the offset portion 16. The brake bars 8 and the connectors 12 being identical, no selection of these parts is necessary in the assembling of carriages, and the same holds true for the foot pedals 9. Consequently, when a large number of carriages of different types, or proportions, have been completely assembled with wheels attached, it is only necessary to connect the link 10 of each carriage for the proper setting of the brake bar. In this way, the adjustment of the brakes for different carriages is rendered independent of the assembly of the parts, and furthermore, the number of different parts necessary for different styles of carriages is reduced by the standardization of the parts of the brake mechanism.

When the treads of the front wheels 4 have worn to a considerable extent, it may be found that the original setting of the brake will not give sufficient pressure on the wheels, in which case it is an easy matter for the user of the carriage to shift the end of the link 10 one or more holes 13 in the direction of the brake bar, which has the effect of shortening the link. In making such adjustments, the link 10 is prevented from becoming entirely disconnected from the connector 12 by reason of the fact that it passes through a slot 17 provided in the turned-over end portion 18 of the connector 12. Furthermore, any such adjustment by the user of the carriage is rendered easy by the fact that the connector 12 is automatically positioned at substantially the middle of the brake bar 8 by the offset portion 16. The relatively loose connection between the head 14 of the connector 12 and the brake bar 8 permits of ready adjustment of the parts, and furthermore, does not weaken the brake bar 8 in any way as, for example, by punching a hole therein for receiving the link.

I claim:

1. In a brake mechanism for baby carriages, a brake bar attached to the frame of the carriage, an operating pedal connected to an axle of the carriage, a connector loosely embracing an offset portion of said brake bar, and a rod extending from said pedal with its end receivable in spaced openings in said connector.

2. In a brake mechanism for baby carriages, a brake bar attached to the frame of the carriage, an operating pedal connected to an axle of the carriage, a connector, a right angle bend in said connector, a slot in said right angle bend, and a rod attached to said pedal, passing through said slot and receivable in one of a plurality of holes in said connector, said slot allowing adjustment of said rod in said connector without disassembling of parts.

3. In a brake mechanism for baby carriages, a brake bar attached to the frame of the carriage, an operating pedal attached to an axle of the carriage, a rod attached to said pedal, and a connector having a plurality of rows of holes in staggered relation, whereby said rod may be adjustably attached to said connector with an adjustment closer than that provided by the distance from one hole to another.

Dated this third day of April, 1925.

GEORGE STINSON.